Jan. 9, 1940.   J. P. HAWORTH   2,186,415
PELLETING MACHINE
Filed Aug. 11, 1939   2 Sheets-Sheet 1
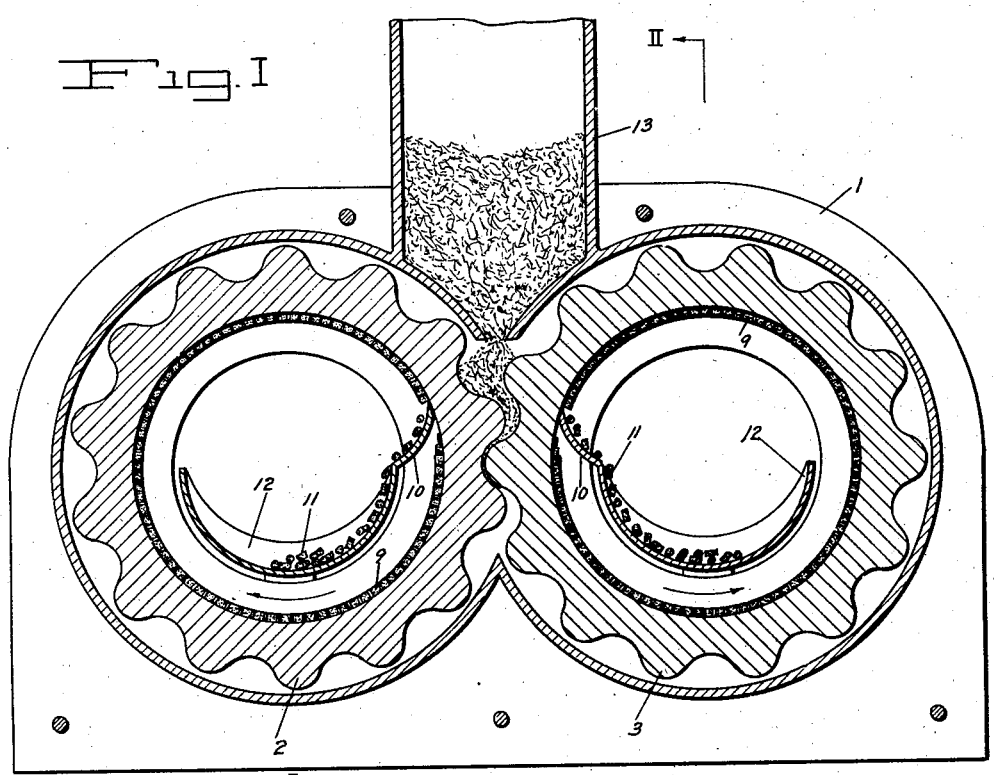
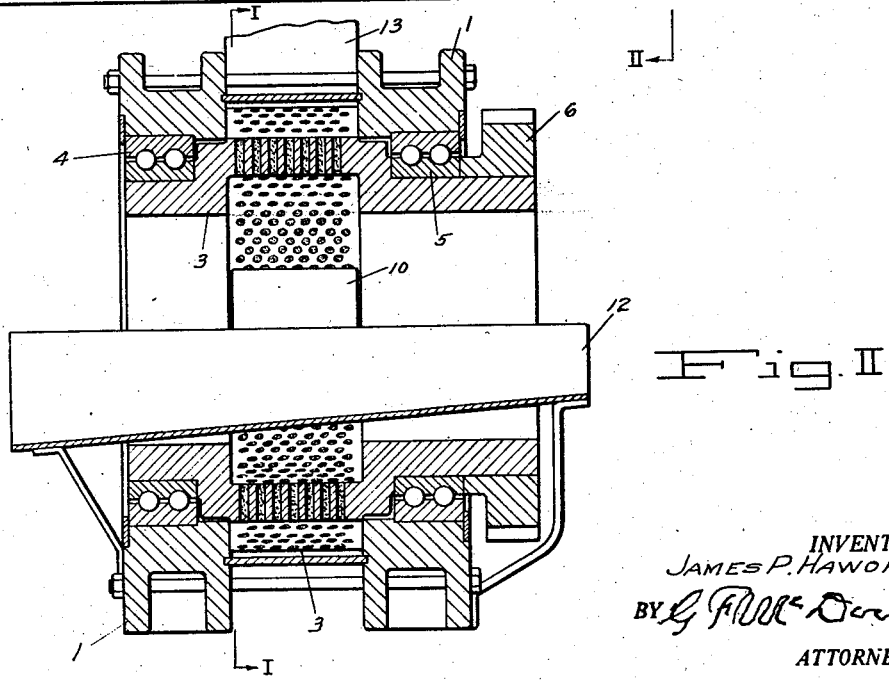
INVENTOR.
JAMES P. HAWORTH
BY
ATTORNEY Jan. 9, 1940.   J. P. HAWORTH   2,186,415
PELLETING MACHINE
Filed Aug. 11, 1939   2 Sheets—Sheet 2
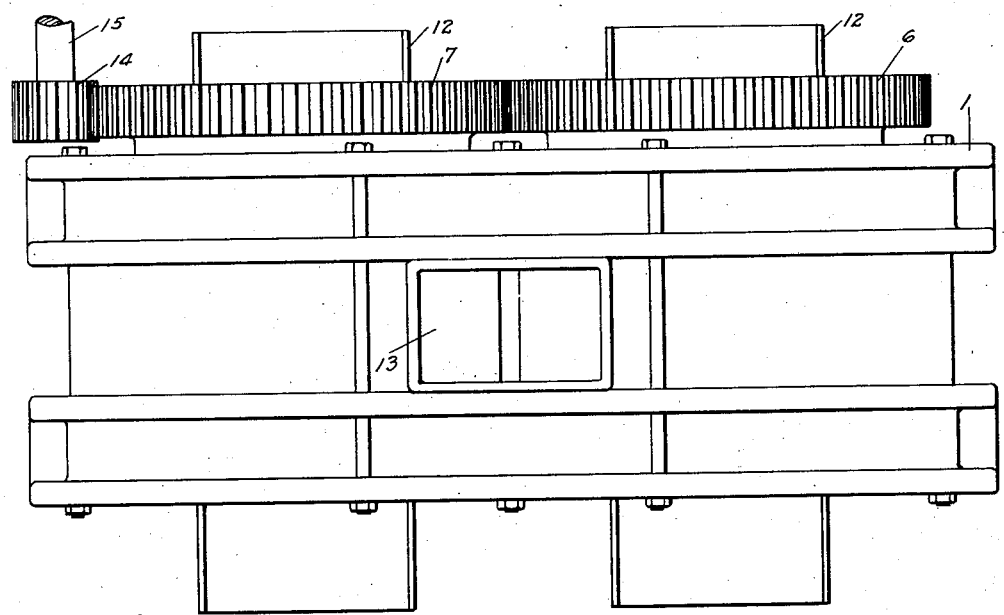
Fig. III
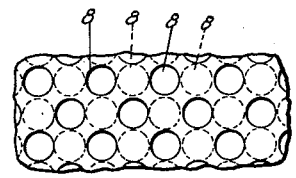
Fig. V
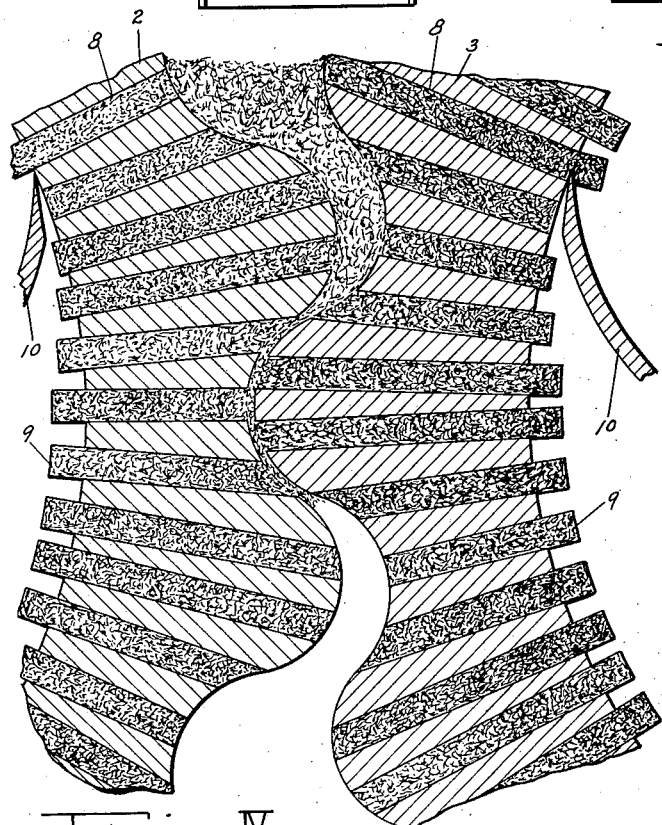
Fig. IV
INVENTOR.
JAMES P. HAWORTH
BY  McDougall
ATTORNEY Patented Jan. 9, 1940

2,186,415

UNITED STATES PATENT OFFICE 2,186,415

PELLETING MACHINE

James P. Haworth, Portland, Oreg.

Application August 11, 1939, Serial No. 289,597

3 Claims. (Cl. 107—8)

My invention relates to a pelleting machine that receives mixed ground feed and compresses it through a die to make pellets, by cutting off the extruded material into pellets of the required length as they are extruded, to make a poultry feed that has many advantages.

Machines designed to accomplish the function stated are an important part of milling machinery since the demand for pellets is heavy, but the machines according to contemporary art take much more power than they should and heat badly, even the product, pellets made of moist ground feed, being partly baked by the power turned into heat by friction.

Moist ground feed packs easily and is not plastic in the sense that it will spread out between rollers in accordance with the pressure applied and when the holes through the die are spaced, as they must be if any strength is to remain in the die, the material packs hard and does not slip sidewise to freely enter the holes. This is the case particularly in those machines that employ a solid roller that traverses the face of a die containing the holes. Countersinking the entrance ends of the holes until the die face is practically covered with holes merely substitutes one problem for another, since an excess wedging action occurs that requires a large amount of power to overcome, results in excessive heat being developed and causes dies made of the very best material to wear rapidly.

A small amount of flare at the inlet end of the hole is deemed necessary to get the required amount of pack. The hole pattern and size should be so proportioned that about 45 per cent of the area is removed by drilling and then they should be reamed with a pin-reamer, taper 0.25" per foot, to such depth that the total surface area of the holes is about half that of the working surface of the die.

The object of the present invention is to so proportion the dies that material pressed through the holes therein always has a place to go in a line that substantially coincides with the lines of force that are applied to the material to be pressed; which may be further expressed as less power consumption per unit of material pelleted, less frictional heat developed and consequently less wear on the dies.

Another object that will be explained together with the structural features to attain it, is a more gradual application of compressive force to the material, whereby a greater number of die holes are working at a given time and the total pressure on the dies is distributed over a greater area of the working face.

These and other objects that will be at once apparent constitute the purposes of the present invention, the scope and nature of which is particularly pointed out in the claims.

I accomplish the stated objects by the structure illustrated in the accompanying drawings, in which,—

Fig. I is a section through Fig. II at I—I, being a cross section of the working part of the pelleting machine;

Fig. II is a section at II—II, Fig. I;

Fig. III is a top plan view;

Fig. IV is an enlarged view of the preferred form of roller perimeter showing the distribution of die holes in a uniform pattern, with the holes so placed and the rolls so timed that each land always registers with a hole, at least in substantial part, which is the most important feature of the invention; and Fig. V is a figure showing the relative mating positions of lands and die holes, the die holes on a mating roll being dotted. This brings out the essential fact that placement of the sinusoidal grooves and complementary ridges is independent of the location of the holes, save that the ridges in one roll are cut so that the staggered rows of holes in one roll are countermatched by the staggered lands on the mating roll.

Further considering the drawings:

1 is a frame member, assembled to hold the rolls 2 and 3 by means of bearings 4 and 5, the rolls being timed by gears 6 and 7.

Die holes 8, Fig. IV, have been omitted from Fig. I as needless and possibly confusing, but are shown enlarged in Fig. IV. Material that has been compressed through the holes is shown as pellet material 9 which is severed from the extruded strings by the knife 10 to form pellets 11.

The rolls 2 and 3 are preferably set so that they run very close together; a clearance of the order of a few thousandths of an inch is better if the timing gears 6 and 7 run without backlash.

A trough 12 is provided in each of the hollow rolls and set at sufficient angle, as shown, so that the cut pellets will fall by gravity to a suitable point of disposal.

The rolls themselves should be made of material that is wear resistant within the limits of economical manufacture and manganese steel is suggested since it can be machined first and heat treated afterwards with little danger of warpage and if a slight amount occurs it can be corrected by grinding the perimeters of the rolls.

To make the rolls in the first instance, I prefer to turn them up on centers so that they are round, then with a sleeve jig I drill the holes and ream them as stated until they are tapered down some distance but not all of the way through. Then the rolls are centered on a gear cutter or a mill with indexing attachment where the surface is cut as a finishing operation. The holes cannot be drilled in suitably hard material if the curved grooves and curved ridges are formed first.

It will be seen at once that gear teeth, or grooves and ridges that approximate them, cannot be used since the material will be compressed between the flanks of the teeth and having no place to go, the teeth will be broken or the machine stopped.

In the drawings, no effort has been made to delineate the tapered holes since description is deemed sufficient.

It will be noted from Fig. IV and also in Fig. I that where the rolls are surfaced as shown, compression of material from the hopper 13 begins almost at once after it leaves the hopper and progressively increases in intensity until the rolls pass dead center. This greatly increases the capacity with the further advantage of distributing the load over the surface of the rolls.

A pinion 14 mounted on a shaft 15 diagrammatically represents a source of power to drive the rolls.

Instead of the trough 12, a blower may be used to discharge the cut pellets from the machine and some advantage from the cooling effect of the blast will be realized. This is not shown, or claimed as a part of the invention.

Having fully disclosed my invention so that those familiar with similar art can make and use it, what I claim is:

1. A pelleting machine comprising in combination a pair of hollow rollers revolubly mounted to roll material between them, each roller being formed with longitudinally disposed curved ridges joined by curved grooves to constitute a sinusoidal external surface, radial holes from the perimeter to the hollow center of the rolls evenly distributed in such manner that approximately one half of the external surfaces of the rolls consist of hole ends, with the rollers so formed and mounted that when revolved together any given hole in one roller will be opposite a land between holes on the companion roller, means for revolving the rolls, means for feeding material to the rolls and means for severing material forced through the holes in the form of compressed pellets.

2. In a pelleting machine, in combination, a pair of hollow rolls that are mounted for revolution in opposite directions to compress material between them, radial holes in uniform pattern that are provided as pellet dies from the perimeter of each roll to the inside thereof that divide the external surface of each roll into approximately equal areas of holes and lands therebetween, timing means for said rolls that are set to register any given land on one roll with a hole on the mating roll as the rolls revolve, means for feeding the rolls and means for severing material pressed through the holes into pellets.

3. In a pelleting machine, a pair of hollow rolls that are mounted to roll together to compress material through die holes from their perimeters to their centers, the said rolls being formed with a series of alternating longitudinal curved ridges and grooves therebetween that roll together and roll apart as the rolls revolve, a uniform pattern of radial die holes from the perimeter to center of each roll, the said die holes being so distributed that a land on one roller will register with a die of substantially equal area on the other roller as the rollers are operated.

JAMES P. HAWORTH.